US007013206B2

(12) United States Patent
Stiller et al.

(10) Patent No.: US 7,013,206 B2
(45) Date of Patent: Mar. 14, 2006

(54) ELECTRICALLY ADJUSTABLE SEMIACTIVE DAMPER CONTROL

(75) Inventors: Alexander Stiller, Garbsen (DE); Stefan Sommer, Garbsen (DE); Jörg Grotendorst, Garbsen (DE); Eberhard Hees, Gochsheim (DE); Thomas Kutsche, Schweinfurt (DE); Wolfgang Schumacher, Bergrheinfeld (DE); Christian Maurischat, Euerbach (DE)

(73) Assignees: Continental Aktiengesellschaft, Hannover (DE); ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/652,472

(22) Filed: Sep. 2, 2003

(65) Prior Publication Data

US 2004/0128040 A1 Jul. 1, 2004

Related U.S. Application Data

(63) Continuation of application No. 10/133,477, filed on Apr. 29, 2002, now abandoned.

(30) Foreign Application Priority Data

Apr. 27, 2001 (DE) .......................................... 101 20 918

(51) Int. Cl.
*F16F 7/10* (2006.01)
*F16M 5/00* (2006.01)

(52) U.S. Cl. ......................... 701/37; 267/136; 188/378; 280/5.5

(58) Field of Classification Search ................... 701/37, 701/38; 267/136, 140.13, 140.14; 188/378, 188/380, 266.6, 284, 322.15, 266, 267, 299.1; 280/5.5, 5.515, 124.16, 5.507, 5.512
See application file for complete search history.

(56) References Cited

U.S. PATENT DOCUMENTS

| | | | |
|---|---|---|---|
| 5,269,557 A | | 12/1993 | Butsuen et al. |
| 5,721,681 A | * | 2/1998 | Borschert et al. ............. 701/37 |
| 5,983,150 A | * | 11/1999 | Sasaki ......................... 701/48 |
| 6,026,338 A | * | 2/2000 | Borschert et al. ............. 701/37 |
| 6,298,293 B1 | * | 10/2001 | Ohsaku ........................ 701/37 |
| 6,314,353 B1 | * | 11/2001 | Ohsaku et al. ................ 701/37 |
| 6,370,458 B1 | * | 4/2002 | Shal et al. .................... 701/37 |
| 6,434,460 B1 | * | 8/2002 | Uchino et al. ................ 701/37 |
| 6,556,907 B1 | * | 4/2003 | Sakai .......................... 701/37 |
| 2001/0024005 A1 | * | 9/2001 | Sakai ...................... 267/64.28 |
| 2001/0025752 A1 | * | 10/2001 | Crawley et al. .......... 188/266.7 |
| 2001/0028154 A1 | * | 10/2001 | Sebe ..................... 280/86.757 |
| 2002/0000352 A1 | * | 1/2002 | Matsumoto et al. ..... 188/282.1 |
| 2002/0053493 A1 | * | 5/2002 | Sintorn et al. ........... 188/282.9 |
| 2002/0108825 A1 | * | 8/2002 | Miller et al. ................ 188/280 |
| 2002/0133277 A1 | * | 9/2002 | Koh .......................... 701/37 |

FOREIGN PATENT DOCUMENTS

| | | |
|---|---|---|
| DE | 38 35 056 | 4/1989 |
| DE | 41 15 061 | 11/1991 |
| DE | 41 35 525 | 4/1992 |
| DE | 41 19 323 | 12/1992 |

* cited by examiner

*Primary Examiner*—Thomas G. Black
*Assistant Examiner*—Tuan C To
(74) *Attorney, Agent, or Firm*—Walter Ottesen

(57) ABSTRACT

One or several vibration dampers of a vehicle suspension have a damping force arrangement wherein a control signal is computed within the actuating range in accordance with a standard control method for adjusting the damper characteristic. The drive of a damper adjustable in accordance with this invention is so improved that body movements (notwithstanding a harder adjusted damping for critical driving situations) are substantially suppressed as early as possible. In specific driving situations, the adjusting range of the damper force is changed in that the upper limit of the adjusting range is raised or lowered and/or the lower limit of the adjusting range is raised or lowered. A soft damper setting takes place preferably in dependence upon signals which announce or display a change of the vehicle longitudinal deceleration or vehicle transverse acceleration.

20 Claims, 3 Drawing Sheets

ELECTRICALLY ADJUSTABLE SEMIACTIVE DAMPER CONTROL

This is a continuation of application Ser. No. 10/133,477, filed Apr. 29, 2002 abandoned.

FIELD OF THE INVENTION

The invention relates to a method and an arrangement for controlling (open loop or closed loop) the damping force for at least one vibration damper of a vehicle wheel suspension.

BACKGROUND OF THE INVENTION

For reasons of driving safety, it is desirable to undertake the electric control of a vehicle damper in such a manner that the driving safety remains ensured even when there is a failure of the damper control because of a defect in the control unit or in the case of a fault with the current supply. This greater driving safety is more likely provided with a harder damping than with a softer damping. For this reason, the control should basically be so designed that the harder damping characteristic becomes effective when there is a fault of the control; whereas, the damping by means of the electric control reacts softer and therefore with greater comfort.

It is known to control semiactive dampers in accordance with the skyhook method. In the skyhook method, a desired damping force is computed which is proportional to the body velocity. In electrically adjustable dampers, a desired current is computed (in general, with an inverse damping characteristic field) from the desired damping force and the determined damping velocity and, with this desired current, an electrical valve changes the damping force in the damper. Because of the characteristic of a passive damper, only the least damaging damping force (the smallest possible damping) is adjusted when there are mutually opposite signs of damping velocity and required damping force.

The parameters of the skyhook controller (especially the proportional coefficient with which the vehicle body velocity is evaluated) or, more generally, the parameters of a characteristic field with which the body velocity is evaluated, are optimized usually with respect to the following: a low body excitation, low wheel load fluctuations and additional subjective criteria such as vehicle handling based on the evaluation of many vehicle maneuvers and these parameters are fixedly adjusted. For a fixed adjustment, a compromise must always be made between the driving comfort and the vehicle handling characteristics. A significant quality advantage is obtained when the control system recognizes specific driving maneuvers wherein the basic matching of the dampers is not used but (adapted in correspondence to the specific driving maneuver) the optimal damping is adjusted in a targeted manner. In the literature, this is done, for example, by changing the proportional coefficient of the body velocity.

The skyhook controller has the disadvantage that the damping force is continuously switched between hard and soft in dependence upon the damper velocity. This can, for example, lead to unwanted acoustic problems. A further disadvantage of the skyhook controller is that the damper automatically adjusts to "soft" when the body velocity is not present. This can lead to unwanted velocity movements (for example, at high vehicle speeds or braking and/or steering maneuvers) and therefore to a deterioration of the driving comfort.

The skyhook method is disclosed, for example, in U.S. Pat. No. 5,172,929 and German patent publication 4,115,061.

SUMMARY OF THE INVENTION

It is an object of the invention to so improve the driving of a damper, which is adjustable in accordance with a standard control method, especially the skyhook method, so that unwantedly occurring body movements in the above-mentioned driving situations are suppressed as early as possible and as much as possible.

The method of the invention is for controlling the damping force for at least one vibration damper of a vehicle wheel suspension of a vehicle. The method includes the steps of: providing a damper for generating a damper force and the damper having a damper characteristic adjustable within an adjusting range for the damping force delimited by upper and lower limit values; detecting a first signal representing the vertical velocity at a part of the vehicle chassis as a suspended mass; detecting a second signal representing the vertical velocity of the unsuspended wheel mass; computing an input control signal based on the first and second signals for adjusting the damper characteristic within the adjusting range in accordance with a standard control process; discretely or continuously adjusting the damping characteristic to the input control signal; and, changing the adjusting range in specific driving situations so as to cause one or both of the upper and lower limits to be raised or lowered.

According to the method of the invention, this does not take place only via a reduction of the control in the manner that the maximum value of the actuating variable is reduced in especially previously defined driving situations and the minimum value of the actuating variable is increased; instead, and in accordance with the invention, a narrowing as well as a widening of the adjusting range is detected. In this way, the situation is taken into account for the driving conditions in which the vehicle body velocity is zero, the dampers of the vehicle are adjusted to soft (and therefore an adjusting range of zero is adjusted) and, starting from this driving condition, the adjusting range is widened when a body acceleration is indicated because of the driving condition. Furthermore, with the invention, the possibility is provided that a wide actuating range is narrowed.

The basic idea of the invention is that the adjusting range of the damper is adapted to the specific driving situation and already then when this driving situation is announced, for example, with the actuation of the brake pedal.

The damping forces, which are generated by the skyhook algorithm in dependence upon the body and damper velocities, are changed via the above changeability of the actuating range of the skyhook algorithm in dependence upon these signals. The damping forces are changed within the technical capability of the particular damper for the duration of the critical driving situation with respect to a possible soft setting or a possible hard setting.

In accordance with a preferred embodiment, the changeability of the maximum value and/or minimum value is coupled to driving dynamic variables, that is, a change of the control range can be coupled to certain pregiven vehicle measured variables.

Signals, which announce or indicate a change of the vehicle longitudinal deceleration, are, for example: changes of the brake pressure, changes of the brake light signal, driver command torque, engine drive torque or accelerator pedal position.

Signals which announce or indicate a change of the vehicle transverse acceleration are, for example: changes of the measured transverse acceleration or the transverse acceleration computed from the steering angle and the vehicle speed.

When determining whether action is required via the control electronics, which are connected to the corresponding sensors, the adjusting variables can be adjusted in the direction of a damping hard adjustment or a damping soft adjustment depending upon weighting. The adjustment is gradual or time delayed, that is, the adjustment is not abrupt.

With the aid of limiting the adjusting range in accordance with the invention, a significantly improved damping of the vehicle velocity is provided especially for acceleration operations in the longitudinal and transverse directions.

BRIEF DESCRIPTION OF THE DRAWINGS

The invention will now be described with reference to the drawings wherein.

DESCRIPTION OF THE PREFERRED EMBODIMENTS OF THE INVENTION

The basic idea of the skyhook method is the assumption that the vehicle body is damped relative to a reference point (skyhook) independent of the vehicle. From this, an idealized damping force is provided by:

$$F_{Sky} = v_A * k_{Sky}$$

wherein:
$F_{Sky}$=skyhook damping force,
$v_A$=body velocity; and,
$k_{Sky}$=damping coefficient.

The above cannot be realized because, on the one hand, such an independent reference point is not given and, on the other hand, the damper is connected to the wheel and chassis in most vehicles and, for this reason, the damper can only influence the relative speed of wheel to body. In semiactive dampers, the damping force is adjusted between $k_{min}$ and $k_{max}$ via the damping coefficient, for example, electrically or pneumatically. The damping force results from the damper velocity and the adjusted damping coefficient (see characteristic field). The practical application of the skyhook method is mostly that, when $$F_{Sky} \text{ and } v_D = dx_A/dt - dx_R/dt$$

have the same sign, the ideal skyhook force is set as:

$$F_D = v_A * k_{Sky}$$

and when $$F_{Sky} \text{ and } v_D = dx_A/dt - dx_R/dt$$

do not have the same sign, that damping force is adjusted which comes closest to the skyhook value:

$$F_D = v_A * k_{min}.$$

Figure 1:
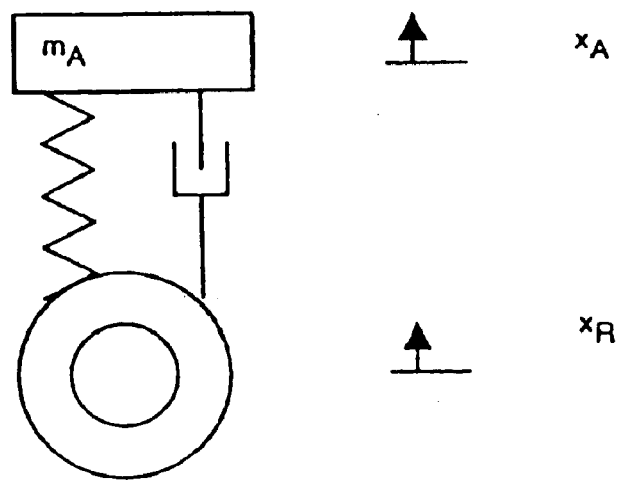
FIG. 1 is a diagram providing a schematic illustration of a wheel suspension.
Figure 2:
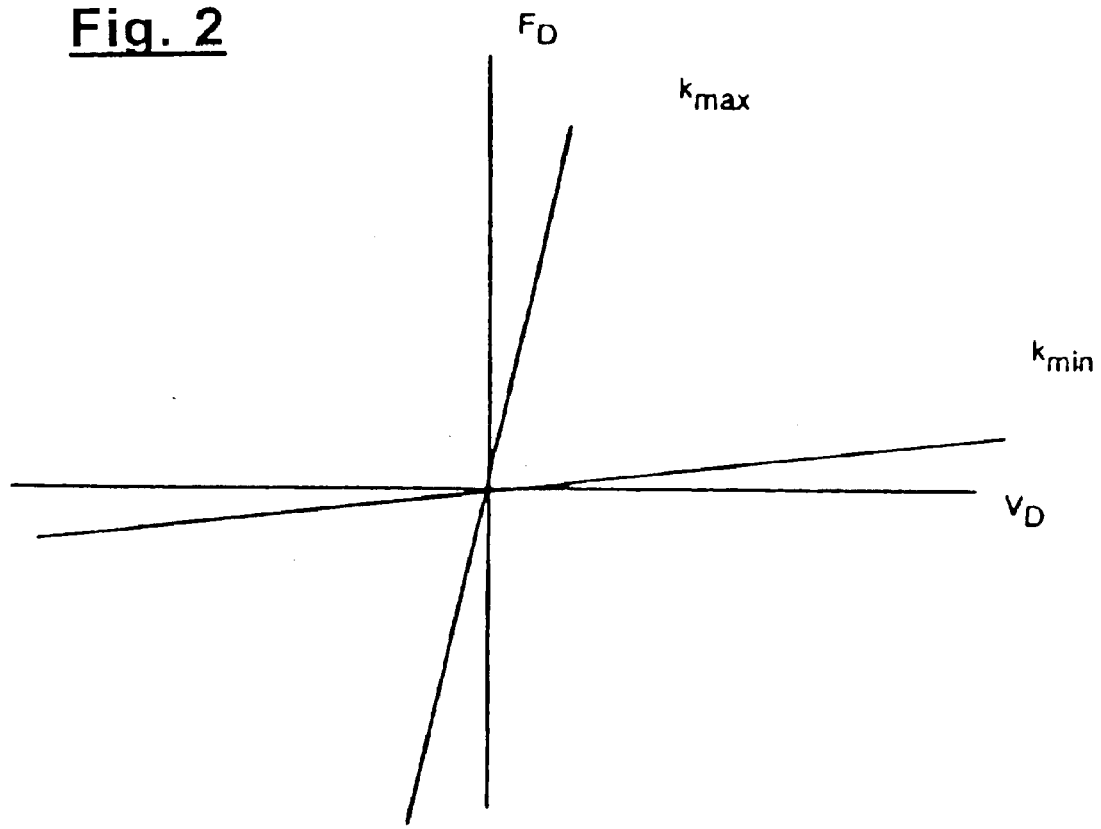
FIG. 2 is a force/velocity diagram.
Figure 3:
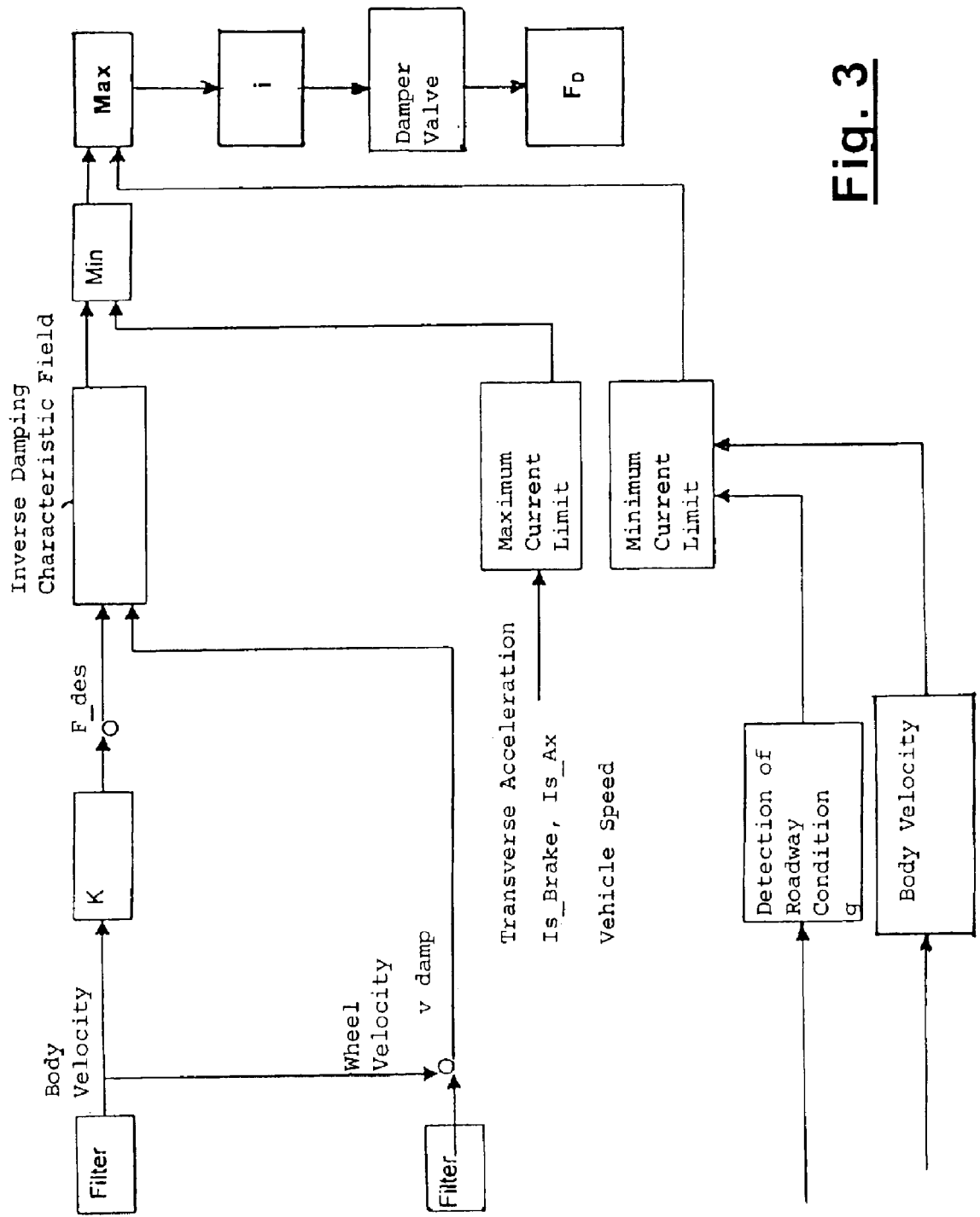
FIG. 3 is a block diagram showing the damping adjustment in accordance with the invention.

The block diagram of FIG. 3 shows an embodiment of the damper electronics of the invention. The sensors (not shown), which are required for the determination of the longitudinal and transverse accelerations and for the determination of roadway unevenness, are arranged on the circuit at the input end. The data (actual values), which are supplied by the sensors, are compared to pregiven desired values. If the actual values exceed the pregiven desired values, then (because of an inverse damping characteristic field) the current for actuating an electronic valve, which acts on the damper, is reduced whereby the damping characteristic is shifted in the direction "hard".

In contrast, the damping force adjustment with respect to the sensor responsible for recognizing the state of the roadway functions differently. If the sensed street unevenness exceeds a pregiven limit value, then a gradual amplified or even maximum current i is applied to the electromagnetic valve, which means a reduction of the damper force $F_D$.

The actuator referred to herein can, for example, be electromagnetic valves or pneumatically actuated valves. What is significant for the invention is influencing the damping force in dependence upon the particular driving situation with the aid of the control method according to the invention and with the arrangement according to the invention for carrying out the method of the invention.

Figure 4:
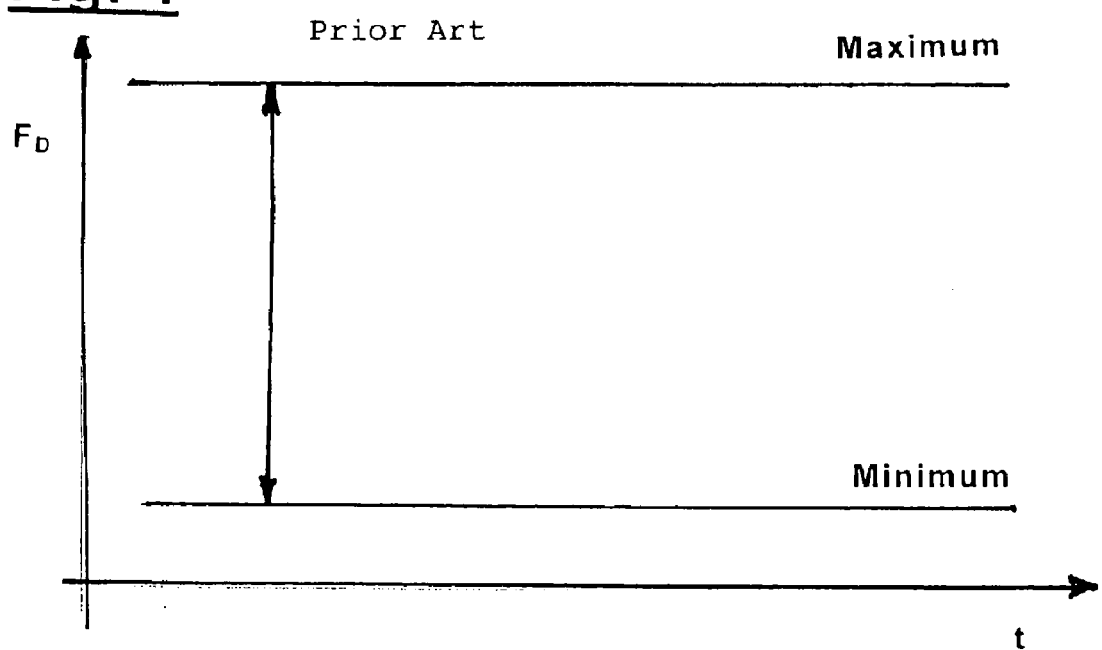
FIG. 4 is a damper force diagram in accordance with the state of the art.

From the diagram of FIG. 4 it can be seen that there is always a switching back and forth of the damping force between the limit values, which are technically possible, that is, minimum and maximum.

Figure 5:
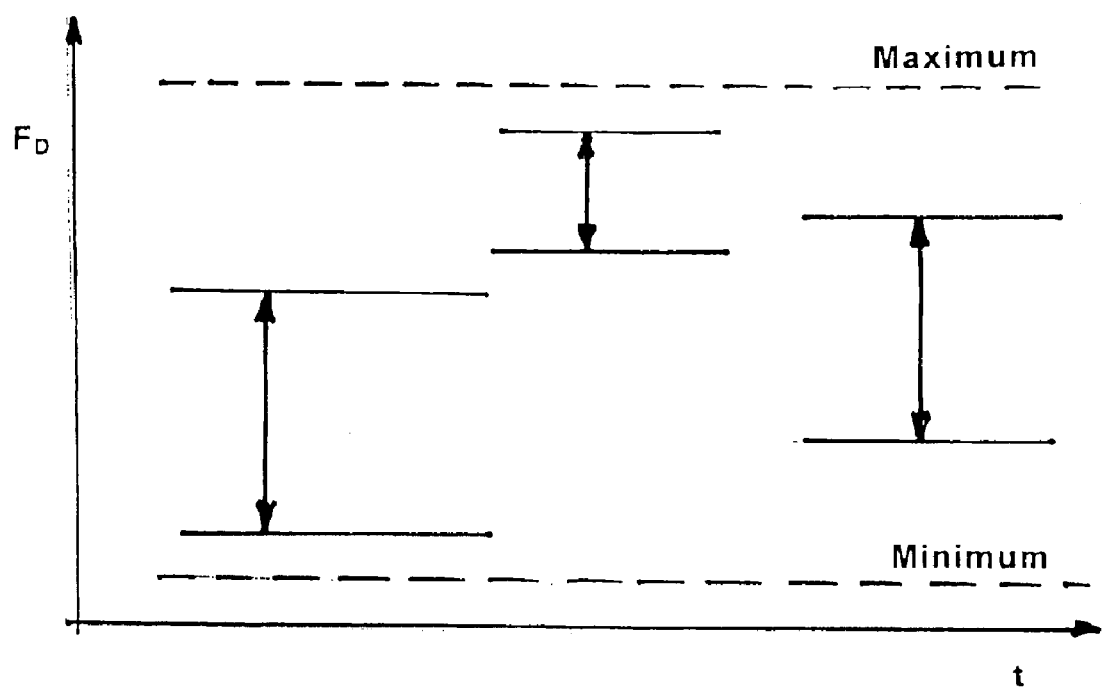
FIG. 5 is a damper force diagram in accordance with the invention.

According to the invention, the upper limit as well as the lower limit can be changed (FIG. 5). With this, there is not only a changeability of the control range but also the particular absolute amount of the damping force can be adjusted. The basic state is given with the minimum damping (soft). For specific driving situations, the adjusting range of the damping is expanded. This can take place in dependence upon the vehicle speed, for example, for a speed range of 60 to 130 km/h and preferably a range of 90 to 110 km/h. Essential to the invention is the change of the damping force adjusting range in each case.

It is understood that the foregoing description is that of the preferred embodiments of the invention and that various changes and modifications may be made thereto without departing from the spirit and scope of the invention as defined in the appended claims.

What is claimed is:

1. A method for controlling the damping force for at least one vibration damper of a vehicle wheel suspension of a vehicle, the method comprising the steps of:

providing a damper for generating a damper force and said damper having a damper characteristic adjustable within an adjusting range for the damping force delimited by upper and lower limit values;

detecting a first signal representing the vertical velocity at a part of said vehicle chassis as a suspended mass;

detecting a second signal representing the vertical velocity of the unsuspended wheel mass;

computing an input control signal based on said first and second signals for adjusting said damper characteristic within said adjusting range in accordance with a standard control process;

discretely or continuously adjusting said damping characteristic to said input control signal; and, changing said adjusting range in dependence upon specific driving situations so as to cause one or both of said upper and lower limits to be raised or lowered.

2. The method of claim 1, comprising the further step of limiting a damper soft setting in dependence on signals which indicate a change of vehicle longitudinal deceleration.

3. The method of claim 1, comprising the further step of limiting a damper soft setting in dependence upon signals which indicate a change of the vehicle transverse acceleration.

4. A method for controlling the damping force for at least one vibration damper of a vehicle wheel suspension of a vehicle, the method comprising the steps of:
provriding a damper for generating a damper force and said damper having a damper characteristic adjustable within an adjusting range for the damping force delimited by upper and lower limit values;
detecting a first signal representing the vertical velocity at a part of said vehicle chassis as a suspended mass;
detecting a second signal representing the vertical velocity of the unsuspended wheel mass;
computing an input control signal based on said first and second signals for adjusting said damper characteristic within said adjusting range in accordance with a standard control process;
discretely or continuously adjusting said damping characteristic to said input control signal;
changing said adjusting range in specific driving situations so as to cause one or both of said upper and lower limits to be raised or lowered; and,
limiting a damper hard setting when detecting large roadway unevenness utilizing adaptive algorithmic circuits or self-learning units.

5. A method for controlling the damping force for at least one vibration damper of a vehicle wheel suspension of a vehicle having a vehicle body, the method comprising the steps of:
providing a damper for generating a damper force and said damper having a damper characteristic adjustable within an adjusting range for the damping force delimited by upper and lower limit values;
detecting a first signal representing the vertical velocity at a part of said vehicle chassis as a suspended mass;
detecting a second signal representing the vertical velocity of the unsuspended wheel mass;
computing an input control signal based on said first and second signals for adjusting said damper characteristic within said adjusting range in accordance with a standard control process;
discretely or continuously adjusting said damping characteristic to said input control signal;
changing said adjusting range in specific driving situations so as to cause one or both of said upper and lower limits to be raised or lowered; and,
permitting a damper hard adjustment in dependence upon the body velocity so as to cause a widening of the adjusting range in the direction of a damper hardening and so as to cause a narrowing of the adjusting range in the direction of a damper hardening.

6. A method for controlling the damping force for at least one vibration damper of a vehicle wheel suspension of a vehicle, the method comprising the steps of:
providing a damper for generating a damper force and said damper having a damper characteristic adjustable within an adjusting range for the damping force delimited by upper and lower limit values;
detecting a first signal representing the vertical velocity at a part of said vehicle chassis as a suspended mass;
detecting a second signal representing the vertical velocity of the unsuspended wheel mass;
computing an input control signal based on said first and second signals for adjusting said damper characteristic within said adjusting range in accordance with a standard control process;
discretely or continuously adjusting said damping characteristic to said input control signal;
changing said adjusting range in specific driving situations so as to cause one or both of said upper and lower limits to be raised or lowered; and
narrowing said adjustment range in a direction of a damper hardening with a permanent priority relative to limiting in the direction of a damper soft setting.

7. The method of claim 1, comprising the further step of limiting an actuating variable in a direction of a soft damper adjustment when determining a defect in the control algorithm.

8. The method of claim 1, comprising the further step of adapting the adjusting range to a specific driving situation.

9. The method of claim 8, wherein the adaptation of said adjusting range always takes place when said specific driving situation is announced.

10. The method of claim 1, wherein said standard control process is the skyhook process.

11. An arrangement for controlling the damping force for at least one vibration damper of a vehicle wheel suspension of a vehicle, the arrangement comprising:
a damper for generating a damper force and said damper having a damper characteristic adjustable within an adjusting range for the damping force delimited by upper and lower limit values;
means for detecting a first signal representing the vertical velocity at a part of said vehicle chassis as a suspended mass;
means for detecting a second signal representing the vertical velocity of the unsuspended wheel mass;
means for computing an input control signal based on said first and second signals for adjusting said damper characteristic within said adjusting range in accordance with a standard control method;
a damping force unit for discretely or continuously adjusting said damping characteristic to said input control signal; and,
means for changing said adjusting range in dependence upon specific driving situations so as to cause one or both of said upper and lower limits to be raised or lowered.

12. The arrangement of claim 11, further comprising means for limiting a damper soft setting in dependence on signals which indicate a change of vehicle longitudinal deceleration.

13. The arrangement of claim 11, further comprising means for limiting a damper soft setting in dependence upon signals which indicate a change of the vehicle transverse acceleration.

14. An arrangement for controlling the damping force for at least one vibration damper of a vehicle wheel suspension of a vehicle, the arrangement comprising:
a damper for generating a damper force and said damper having a damper characteristic adjustable within an adjusting range for the damping force delimited by upper and lower limit values;
means for detecting a first signal representing the vertical velocity at a part of said vehicle chassis as a suspended mass;
means for detecting a second signal representing the vertical velocity of the unsuspended wheel mass;

means for computing an input control signal based on said first and second signals for adjusting said damper characteristic within said adjusting range in accordance with a standard control method;

a damping force unit for discretely or continuously adjusting said damping characteristic to said input control signal;

means for changing said adjusting range in specific driving situations so as to cause one or both of said upper and lower limits to be raised or lowered; and, means for limiting a damper hard setting when detecting large roadway unevenness utilizing adaptive algorithmic circuits or self-learning units.

15. An arrangement for controlling the damping force for at least one vibration damper of a vehicle wheel suspension of a vehicle having a vehicle body, the arrangement comprising:

a damper for generating a damper force and said damper having a damper characteristic adjustable within an adjusting range for the damping force delimited by upper and lower limit values;

means for detecting a first signal representing the vertical velocity at a part of said vehicle chassis as a suspended mass;

means for detecting a second signal representing the vertical velocity of the unsuspended wheel mass;

means for computing an input control signal based on said first and second signals for adjusting said damper characteristic within said adjusting range in accordance with a standard control method;

a damping force unit for discretely or continuously adjusting said damping characteristic to said input control signal;

means for changing said adjusting range in specific driving situations so as to cause one or both of said upper and lower limits to be raised or lowered; and, means for making a hard damper setting in dependence upon the body velocity so as to cause a widening of the adjusting range in the direction of a damper hardening and so as to cause a narrowing of the adjusting range in the direction of a damper hardening.

16. An arrangement for controlling the damping force for at least one vibration damper of a vehicle wheel suspension of a vehicle, the arrangement comprising;

a damper for generating a damper force and said damper having damper characteristic adjustable within an adusting range for the damping force delimited by upper and lower limit values;

means for detecting a first signal representing the vertical velocity at a part of said vehicle chassis as a suspended mass;

means for detecting a second signal representing the vertical velocity of the unsuspended wheel mass;

means for computing an input control signal based on said first and second signals for adjusting said damper characteristic within said adjusting range in accordance with a standard control method;

a damping force unit for discretely or continuously adjusting said damping characteristic to said input control signal;

means for changing said adjusting range in specific driving situations so as to cause one or both of said unper and lower limits to be raised or lowered; and, means for narrowing said adjustment range in a direction of a damper hardening with a permanent priority relative to limiting in the direction of a damper soft setting.

17. The arrangement of claim 11, further comprising means for limiting an actuating variable in a direction of a soft damper adjustment when determining a defect in the control algorithm.

18. The arrangement of claim 11, further comprising means for adapting the adjusting range to a specific driving situation.

19. The arrangement of claim 11, wherein said adjusting range is changed in dependence upon the speed of the vehicle.

20. The method of claim 1, wherein said adjusting range is changed in dependence upon the speed of the vehicle.

* * * * *